United States Patent [19]

Masheff

[11] Patent Number: 4,592,009
[45] Date of Patent: May 27, 1986

[54] MSK SURFACE ACOUSTIC WAVE CONVOLVER

[75] Inventor: Michael S. Masheff, St. Petersburg, Fla.

[73] Assignee: E-Systems, Inc., Dallas, Tex.

[21] Appl. No.: 552,835

[22] Filed: Nov. 17, 1983

[51] Int. Cl.$^4$ .................. G06G 7/195; H03H 9/30; H01L 41/08
[52] U.S. Cl. ..................... 364/821; 364/819; 333/195; 310/313 R
[58] Field of Search ............... 364/819, 821, 825, 724, 364/728, 604; 367/135, 140; 333/24 R, 150, 154, 161, 186, 193, 195; 310/313 R, 313 B

[56] References Cited

U.S. PATENT DOCUMENTS

| | | | |
|---|---|---|---|
| 4,070,638 | 1/1978 | Reeder | 364/821 X |
| 4,181,904 | 1/1980 | Weller et al. | 333/195 X |
| 4,207,545 | 6/1980 | Grudkowski et al. | 333/150 |
| 4,247,903 | 1/1981 | Grudkowski et al. | 364/821 |
| 4,388,599 | 6/1983 | Gautier et al. | 333/150 |
| 4,448,805 | 5/1984 | Lewis | 310/313 R X |
| 4,468,639 | 8/1984 | Green et al. | 333/195 X |
| 4,473,888 | 9/1984 | Smith | 364/821 |
| 4,485,363 | 11/1984 | Hunsinger et al. | 333/193 |

Primary Examiner—Gary V. Harkcom
Attorney, Agent, or Firm—Albert M. Crowder, Jr.

[57] ABSTRACT

A surface acoustic wave (SAW) convolver is provided for use in a communication system in which a received signal incorporates a mixed pseudonoise (PN) code sequence and narrowband information signal phase-modulated thereon according to a minimum shift keying (MSK) modulation scheme. The convolver includes a piezoelectric substrate capable of propagating acoustic wave signals on the top surface thereof, and a first transducer formed on the top surface for receiving the received signal and in response thereto generating acoustic surface waves along a first direction thereof. A second transducer is also formed on the top surface for receiving a reference signal and in response thereto generating acoustic surface waves along a second direction thereof, the reference signal incorporating the PN code sequence phase-modulated thereon according to a bi-phase shift keying (BPSK) modulation scheme. A BPSK-MSK converter integrally-formed on the substrate produces the reference signal in MSK form. This structure provides a receiver having lower power consumption, fewer parts, reduced size, cost and weight and improved reliability.

17 Claims, 3 Drawing Figures

MSK SURFACE ACOUSTIC WAVE CONVOLVER

TECHNICAL FIELD

The present invention relates generally to surface acoustic wave (SAW) devices and particularly to use of such a device to convolve a reference signal and an information signal in a receiver of an MSK system.

BACKGROUND OF THE INVENTION

In a spread spectrum communication system, the spread spectrum signal may be formed by mixing a narrowband information signal with a pseudonoise (PN) code sequence, and then phase modulating this mixed signal. One such phase modulating technique is minimum shift keying (MSK). MSK signal modulation is popular since signals produced thereby have nearly continuous amplitude envelopes and low spectral sidelobes as compared to similar bi-phase (or quadrature) shift keyed (BPSK) signals.

In MSK systems, effective recovery of the narrowband information signal at the receiver requires synchronization between the received spread spectrum signal's PN code sequence and a local PN code sequence incorporated in a reference signal with which the receive signal is correlated. Surface acoustic wave devices have been used in such systems to convolve the received spread spectrum signal and the reference signal. Such devices typically include first and second transducers formed on the top surface of a piezoelectric substrate for producing surface acoustic waves in response to the received spread spectrum signal and reference signal applied thereto. Typically, the convolver includes a conductor material placed intermediate of the first and second transducers. The transduced input and reference signals are combined under the conductor, where crystal non-linearity produces product signals that are then spatially integrated by the conductor to produce a convolution of the signals.

To effectively convolve the input and reference signals, these signals must utilize the same modulation scheme. In prior art systems, the reference signal was formed by mixing a reference PN code sequence with a local oscillator signal to produce a bi-phase shift keyed signal. This BPSK signal was then applied to an external surface acoustic wave device which converted the signal to an MSK form and then back to the electrical domain.

External transformations between the acoustical and electrical domains are disadvantageous since they degrade the signal and increase the power consumption and cost of the receiver. Therefore, there is a need to provide a surface acoustic wave convolver for use in a receiver of an MSK communication system which obviates these additional external transformations.

SUMMARY OF THE INVENTION

The present invention provides a surface acoustic wave (SAW) convolver for use in a receiver of a communication system in which a narrowband information signal is transmitted by a minimum shift-keyed (MSK) modulation scheme. The surface acoustic wave convolver comprises a piezoelectric substrate capable of propagating acoustic wave signals on the top surface thereof, a first transducer formed on the top surface for receiving the MSK-modulated information signal and in response thereto generating acoustic surface waves along a first direction thereof, and a second transducer formed on the top surface for receiving a BPSK reference signal and a response thereto generating acoustic surface waves along a second direction thereof. In accordance with the invention, a converter is integrally-formed on the piezoelectric substrate for converting the BPSK reference signal to an MSK form. Since the converter is formed on the SAW convolver device itself, external transformation of the reference signal between the acoustical and electrical domains is obviated. This structure provides a receiver having lower power consumption, fewer parts, reduced size, cost and weight, and improved reliability with respect to the prior art.

In a preferred embodiment of the invention, the converter comprises first and second electrodes each having an array of fingers, the fingers of the first and second electrodes being formed in an interdigital structure. The first electrode is placed at ground potential while the second electrode has a varying potential with respect to ground according to the reference signal applied thereto. According to another feature of the invention, first and second beamwidth compressors are located on the top surface of the substrate for compressing the beamwidths of the received and reference signals. The converter is advantageously located on the top surface of the substrate intermediate of the second transducer and the second beamwidth compressor. Finally, the surface acoustic wave convolver includes a conductor acoustic waveguide located intermediate of the first and second beamwidth compressors for convolving the received signal and the reference signal to produce a convolution of these signals.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
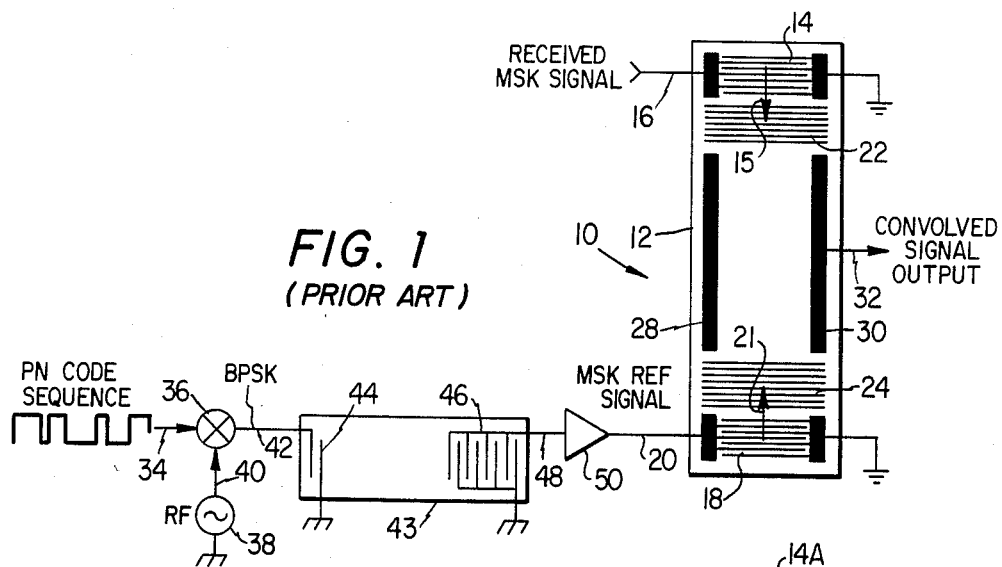
FIG. 1 is a schematic diagram of a prior art receiver for a spread spectrum communication system which incorporates a SAW convolver and an external SAW device to form the MSK reference signals.

Referring now to the drawings in which like reference characters designate like or corresponding parts throughout the several views, FIG. 1 shows a schematic diagram of a prior art receiver for use in a spread spectrum communication system, the receiver incorporating a SAW convolver and an external SAW device to form an MSK reference signal. Specifically, the surface acoustic wave convolver 10 comprises an elongated, planar substrate 12 which is formed of a suitable acoustic wave material capable of propagating acoustic wave signals on the top surface thereof. Preferably, the substrate 12 is formed from a piezoelectric material such as lithium niobate, $LiNbO_3$. The SAW convolver 10 includes a first transducer 14 formed on the top surface of the substrate 12 for receiving an MSK received signal via line 16 and in response thereto generating acoustic surface waves along a first direction thereof. This direction is represented by the arrow 15. The SAW convolver also includes a second transducer 18 formed on the top surface of the substrate 12 for receiving an MSK reference signal via an input line 20 and in response thereto generating acoustic surface waves along a second direction thereof, as indicated by the arrow 21. As is well-known in the prior art, each of the transducers 14 and 18 comprises first and second interdigitally arranged electrodes formed on the top surface of the substrate 12. The interdigital electrodes each include a plurality of spaced, electrically conductive fingers.

Utilizing the first and second transducers 14 and 18, surface waves are propagated along the top surface of the substrate 12 in the directions indicated generally by the arrows 15 and 21. The acoustic surface waves generated by the first transducer 14 propagate through a first beamwidth compressor 22 formed on the top surface of the substrate 12. Similarly, the surface acoustic waves generated by the second transducer 18 propagate through a second beamwidth compressor 24 also formed on the top surface of the substrate 12. The beamwidth compressors 22 and 24 decrease the beamwidth of the acoustic surface waves incident thereto, increasing the acoustic power density and the efficiency of the device.

The beamwidth-compressed received and reference signals continue to propagate along the top surface of the substrate 12, simultaneously occupying an integrating acoustic waveguide region comprising first and second signal waveguides 28 and 30. In particular, the signal waveguides 28 and 30 each comprise a thin conductor film overlay deposited on the substrate 12. These waveguides also guide the signals in the integrating region and serve as output pickup plates in order to extract the convolved signal. In operation, when the surface acoustic waves simultaneously occupy the integrating region, mixing products are produced by the non-linearity of the crystal. These mixing products are spatially integrated by the conductive waveguides, and the convolved output signal is extracted on the output line 32.

The SAW convolver 10 of FIG. 1 effects recovery of the narrowband information signal incorporated in the MSK received signal. In particular, in a spread spectrum communication system, the spread spectrum signal may be formed by mixing the narrowband information signal with a pseudonoise (PN) code sequence, and phase modulating this mixed signal. In such systems, effective recovery of the narrowband information signal at the receiver requires synchronization between the received signal's PN code sequence and a local PN code sequence which is theoretically identical with the transmitted PN code sequence. To provide the synchronization, a local PN code sequence is generated and incorporated in a reference signal with which the received signal is correlated in the convolver 10. Since convolution and correlation are related by time reversal, the convolver 10 serves as a programmable matched filter when the reference signal is a time-reversed replica of the desired waveform. When the received signal and the reference signal counterpropagate along the top surface of the substrate 12 of the convolver 10, matched filtering as achieved.

As noted above, the spread spectrum signal is formed by phase modulating a signal incorporating a PN code sequence and the narrowband information signal. One such phase modulating technique utilizes minimum shift keying (MSK) modulation which is defined as continuous phase frequency shift keying with a modulation index of 0.5. The major advantages of MSK modulation is that signals produced thereby have nearly continuous amplitude envelopes and low spectral sidelobes as compared to similar bi-phase shift keyed (BPSK) signals.

Referring back to FIG. 1, it can now be seen how the SAW convolver 10 is used to produce the matched filtered convolved output signal. To effectively convolve the received and reference signals, these signals must be in the same modulation scheme. The reference MSK signal is formed by providing a PN code sequence via line 34 to one input of a bi-phase mixer 36, the other input thereof provided by a local RF oscillator 38 via line 40. As described above, the local PN code sequence applied via line 34 is theoretically identical to the time reversed PN code sequence incorporated in the transmitted MSK signal. The output of the bi-phase mixer 36 is a bi-phase shift keyed (BPSK) signal which is then applied via the line 42 to a surface acoustic wave device 43. Since the signal present on line 42 at the output of the mixer 36 is in a BPSK form, the SAW device 43 is provided to convert this BPSK signal into an MSK form.

Specifically, the SAW device 43 includes a wideband transducer 44 which transduces the BPSK signal from the electrical to the acoustical domain. The acoustic representation of the BPSK signal applied to the SAW device 43 is then converted to MSK form by the BPSK-MSK converter 46 formed on the substrate thereof. This converter also transduces the acoustic surface waves back into the electrical domain and the resultant MSK signal is output on line 48. This output signal is then applied to amplifier 50 to form the MSK reference signal which is applied via line 20 to the second transducer 18 of the convolver 10.

The prior art spread spectrum receiver disclosed in FIG. 1 for providing MSK signal convolution was designed to obviate the extensive circuitry necessary to generate the MSK reference signal. In particular, before the use of the structure shown in FIG. 1, it was common to generate the MSK reference signal entirely in the electrical domain, a technique which was costly and inefficient. The use of the SAW device 43 as an alternative to the conventional digital technique was an improvement, however, this technique still suffers from a number of disadvantages. First, the use of the structure seen in FIG. 1 to generate the MSK reference signal suffers from relatively high insertion losses. When using such a structure to generate MSK signals for convolution, the addition of amplifiers to compensate for these losses is necessary. Perhaps more importantly, the use of an external SAW device requires two additional transformations between the acoustical and electrical domains, transformations which may degrade the signal. The structure shown in FIG. 1, although an improvement over the conventional digital technique for producing the MSK reference signal entirely in the electrical domain, is still more unreliable and costly.

Figure 2:
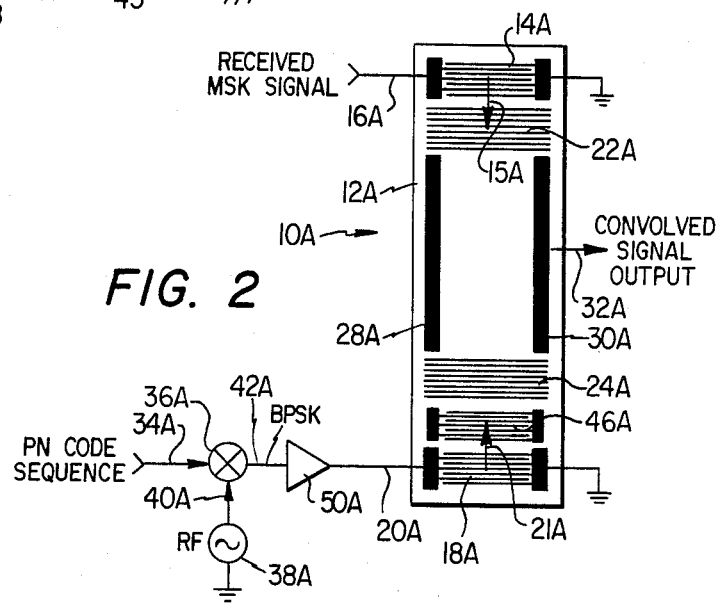
FIG. 2 is a schematic diagram of the SAW convolver of the present invention wherein a BPSK-MSK converter is integrally-formed on the device itself for producing the MSK reference signal.

The present invention ameliorates the problems of prior art techniques for generating the MSK reference signal by performing the BPSK to MSK conversion on the convolver substrate itself. Referring now to FIG. 2, a SAW convolver 10A again comprises the substrate 12A, first and second transducers 14A and 18A, first and second beamwidth compressors 22A and 24A, signal waveguides 28A and 30A, and an output line 32A. In accordance with the present invention, the SAW convolver 10A further includes a BPSK-MSK signal converter 46A which is integrally-formed on a substrate 12A. In particular, it can be seen that in the receiver shown in FIG. 2, an external SAW device is not utilized. To the contrary, the BPSK signal is generated and applied directly to the second transducer 18A on the top surface of the convolver 10A. Specifically, the PN code sequence is applied via the input line 34A to one input of the bi-phase mixer 36A, the other input thereto provided by a local RF oscillator 38A via line 40A. The BPSK signal produced on the output line 42A from the mixer 36A is applied to amplifier 50A and then applied directly via line 20A to the second transducer 18A on the convolver 10A.

In operation of the receiver of FIG. 2, the BPSK reference signal is generated and applied to the second transducer 18A, which transduces this signal from the electrical domain to the acoustical domain. The surface acoustic waves generated by the second transducer 18A propagate along the top surface of the substrate 12A in the direction of the arrow 21A and through the BPSK-MSK converter 46A. As a result, the surface acoustic waves representing the BPSK reference signal are converted to MSK form, and are thus compatible with the surface acoustic waves generated by the first transducer 14A representing the MSK received signal. As in the FIG. 1 embodiment, the surface acoustic waves counterpropagate along the top surface of the substrate 12A of the convolver 10A, through the first and second beamwidth compressors 22A and 24A, and then meet in the integrating acoustic waveguide region comprising waveguides 28A and 30A. As described above, the non-linearity of the crystal in the integrating region produces mixing products which are then spatially integrated to form the convolution of the received and reference signals. This convolution signal is then extracted from the SAW convolver 10A via the output line 32A.

Therefore, according to the present invention, a surface acoustic wave convolver for use in a communication system is provided wherein an MSK reference signal is formed directly on the convolver itself. In particular, the convolver comprises a substrate capable of propagating acoustic wave signals on the top surface thereof, a first transducer for receiving an MSK received signal and in response thereto generating acoustic surface waves along a first direction of the substrate, and a second transducer for receiving a BPSK reference signal and in response thereto generating acoustic surface waves along a second direction of the substrate. To obviate additional external transformations between the electrical and the acoustical domains, the BPSK-MSK converter is integrally-formed on the substrate for converting the acoustical representation of the BPSK reference signal to an MSK form. Since the BPSK-MSK conversion is done directly on the convolver itself, there is no insertion loss due to the additional signal transformation between the electrical and the acoustical domain, consequentially there is no need for additional amplification. This structure thus provides benefits such as a lower parts count and a lower power consumption. Moreover, the structue is reduced in size and weight as compared to prior art receivers and has improved reliability.

Figure 3:
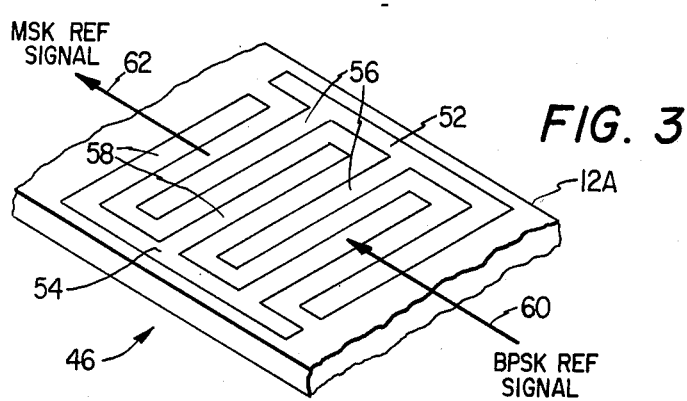
FIG. 3 is a perspective view of the top surface of the SAW convolver of FIG. 2 showing the details of the BPSK-MSK converter structure.

As seen in FIG. 2 the BPSK-MSK converter is located on the top surface of the substrate 12A intermediate of the second transducer 18A and the second beamwidth compressor 24A. Referring now to FIG. 3, the structure of the BPSK-MSK converter 46A is shown in more detail. In particular, the converter 46A comprises first and second interdigitally arranged electrodes 52 and 54 formed on the top surface of the substrate 12A. The interdigital electrodes 52 and 54 each include a plurality of spaced, electrically conductive fingers 56 and 58, respectively, also formed on the top surface of the substrate 12A. The fingers 56 of the first electrode 52 extend intermediate and adjacent of the fingers 58 of the second electrode 54. The interdigital spacing between adjacent fingers 56 and 58 is typically on the order of one-half of an acoustic wavelength of the surface wave on the substrate 12A. It can be seen that the BPSK-MSK converter 46 has essentially the same structure as the first and second transducers 14A and 18A. As seen in FIG. 3, the BPSK reference signal propagates, as designated by the arrow 60, through the converter 46 and is transformed into the MSK reference signal, designated by the arrow 62. This MSK reference signal then propagates through the second beamwidth compressor 24A and into the integrating region as described above with respect to FIG. 2. As also seen in FIG. 3, the first and second electrodes 52 and 54 have varying potentials with respect to ground according to the BPSK reference signal applied thereto from the second transducer 18A.

The present invention thus provides an improved surface acoustic wave convolver for use in a receiver of a spread spectrum communication system wherein a BPSK reference signal is generataed in the receiver and then converted to MSK form directly on the substrate of the convolver itself. As seen in FIG. 3, the converter comprises interdigital electrodes each including a plurality of spaced, electrically conductive fingers for providing the BPSK to MSK conversion. As discussed above with respect to FIG. 2, this structure obviates external acoustical to electrical transformation of the BPSK reference signal in order to form the MSK reference signal. Therefore, with the structure of the present invention, there is no need for additional amplification to make up for the transformation loss produced by such external transformation. The end result is a receiver having lower power consumption, fewer parts count, reduced size, cost and weight, and improved reliability with respect to prior art spread spectrum communication receivers utilizing SAW convolvers.

Although the above discussion has been directed to a spread spectrum communication system in which the narrow band information signal is transmitted by an MSK modulation scheme, it should be recognized that the basic concept of the invention may be applicable to communication systems other than spread spectrum. Therefore, the scope of the present invention is not deemed to be limited to a spread spectrum communication system which utilizes an MSK spread spectrum signal.

Although the invention has been described and illustrated in detail, it is to be clearly understood that the same is by way of illustration and example only and is not to be taken by way of limitation. The spirit and scope of this invention are to be limited only by the terms of the appended claims.

I claim:

1. A surface acoustic wave (SAW) convolver for use in a communication system in which a received signal incorporates a narrowband information signal phase-modulated thereon according to a first modulation scheme, comprising:

a substrate for propagating acoustic wave signals on the top surface thereof;

first transducer means formed on said top surface for receiving said received signal and in response thereto generating acoustic surface waves along a first direction thereof;

second transducer means formed on said top surface for receiving a reference signal and in response thereto generating acoustic surface waves along a second direction thereof, said reference signal incorporating a pseudonoise (PN) code sequence phase-modulated thereon according to a second modulation scheme;

means integrally-formed on said substrate for converting said acoustic surface waves representing said reference signal into a form compatible with said first modulation scheme, said means for converting including first and second interdigital eletrodes each having varying potentials with respect to ground according to the acoustic surface waves representing said reference signal and each including a plurality of spaced, electrically conductive fingers; and means for convolving said received signal and said reference signal to produce a convolution signal.

2. The surface acoustic wave convolver as described in claim 1 wherein said first transducer means generates minimum shift keying (MSK) acoustic surface waves.

3. The surface acoustic wave convolver as described in claim 1 wherein said second transducer means generates bi-phase shift keying (BPSK) acoustic surface waves.

4. The surface acoustic wave convolver as described in claim 1 further including first and second beamwidth compressors located on said top surface for compressing the beamwidths of said received and reference signals.

5. The surface acoustic wave convolver as described in claim 4 wherein said means for converting is located on said top surface intermediate of said second transducer means and said second beamwidth compressor.

6. The surface acoustic wave convolver as described in claim 4 wherein said first beamwidth compressor is located on said top surface next to said first transducer means.

7. The surface acoustic wave convolver as described in claim 4 wherein said means for convolving is a conductor material located on said top surface intermediate of said first and second beamwidth compressors.

8. The surface acoustic wave convolver as described in claim 1 further including a connector for extracting said convolution signal from said top surface.

9. A surface acoustic wave convolver for use in a communication system in which a received signal incorporates a mixed pseudonoise (PN) code sequence and narrowband information signal phase-modulated thereon according to a minimum shift keying (MSK) modulation scheme, comprising:

a piezoelectric substrate for propagating acoustic wave signals on the top surface thereof;

a first transducer formed on said top surface for receiving said received signal and in response thereto generating MSK acoustic surface waves along a first direction thereof;

a second transducer formed on said top surface for receiving a bi-phase shift keying (BPSK) reference signal and in response thereto generating BPSK acoustic surface waves along a second direction thereof, said reference signal incorporating said PN code sequence phase-modulated thereon according to said bi-phase shift keying modulation scheme;

conversion means integrally-formed on said substrate for converting said BPSK acoustic surface waves representing said BPSK reference signal to MSK acoustic surface waves; and convolving means for receiving said MSK surface acoustic waves representing said received signal and said reference signal and generating a convolution signal in response thereto.

10. The surface acoustic wave convolver as described in claim 9 wherein said conversion means include first and second interdigital electrodes each including a plurality of spaced, electrically conductive fingers.

11. The surface acoustic wave convolver as described in claim 10 wherein in said first and second electrodes have varying potentials with respect to ground according to said BPSK surface acoustic waves representing said BPSK reference signal applied thereto from said second transducer.

12. The surface acoustic wave convolver as described in claim 9 further including first and second beamwidth compressors located on said top surface for compressing the beamwidths of said received signal and said reference signal.

13. The surface acoustic wave convolver as described in claim 12 wherein said conversion means is located on said top surface intermediate of said second transducer and said second beamwidth compressor.

14. The surface acoustic wave convolver as described in claim 12 wherein said convolving means is a conductor material located on said top surface intermediate of said first and second beamwidth compressors.

15. The surface acoustic wave convolver as described in claim 9 further including a connector for extracting said convolution signal from said top surface.

16. A surface acoustic wave convolver for use in a communication system in which a received signal incorporates a mixed pseudonoise (PN) code sequence and narrowband information signal phase-modulated thereon according to a minimum shift keying (MSK) modulation scheme, comprising:

a piezoelectric substrate for propagating acoustic wave signals on the top surface thereof;

a first transducer formed on said top surface for receiving said received signal and in response thereto generating MSK acoustic surface waves along a first direction thereof;

a second transducer formed on said top surface for receiving a bi-phase shift keying (BPSK) reference signal and in response thereto generating BPSK acoustic surface waves along a second direction thereof, said reference signal incorporating said PN code sequence phase-modulated thereon according to said bi-phase shift keying modulation scheme;

first and second beamwidth compressors located on said top surface for compressing the beamwidths of said acoustic surface waves representing said received signal and said reference signal;

a converter integrally-formed on said substrate and located on said top surface intermediate of said second transducer and said second beamwidth compressor, for converting said BPSK surface acoustic waves representing said BPSK reference signal to MSK acoustic surface waves; and a convolver for receiving said MSK acoustic surface waves representing said received signal and said reference signal and generating a convolution signal in response thereto.

17. The surface acoustic wave convolver as described in claim 16 wherein said convolver includes a conductor material located on said top surface intermediate of said first and second beamwidth compressors.

* * * * *